(12) United States Patent
Qureshi et al.

(10) Patent No.: US 7,642,333 B2
(45) Date of Patent: Jan. 5, 2010

(54) ANHYDRIDE AND RESORCINOL LATENT CATALYST SYSTEM FOR IMPROVING CURE CHARACTERISTICS OF PHENOLIC RESINS

(75) Inventors: Shahid P. Qureshi, Duluth, GA (US); Charles C. Chan, Snellville, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 11/751,184

(22) Filed: May 21, 2007

(65) Prior Publication Data

US 2008/0293911 A1 Nov. 27, 2008

(51) Int. Cl.
*C08G 8/04* (2006.01)
*C08G 14/02* (2006.01)
*C08G 8/02* (2006.01)

(52) U.S. Cl. .................. 528/144; 528/128; 528/129

(58) Field of Classification Search ............... 528/129, 528/144
See application file for complete search history.

(56) References Cited

U.S. PATENT DOCUMENTS

| | | | | |
|---|---|---|---|---|
| 2,609,351 A * | 9/1952 | Taat et al. ................... 525/502 |
| 3,251,791 A | 5/1966 | Goodchild |
| 3,740,358 A | 6/1973 | Christie et al. |
| 4,146,686 A | 3/1979 | Jones |
| 4,250,274 A | 2/1981 | Damico et al. |
| 4,317,754 A | 3/1982 | Hara et al. |
| 4,393,186 A | 7/1983 | Damico et al. |
| 4,426,484 A * | 1/1984 | Saeki et al. ................. 524/541 |
| 5,034,497 A * | 7/1991 | Waitkus ..................... 528/129 |
| 5,075,413 A | 12/1991 | Dailey, Jr. |
| 5,075,414 A | 12/1991 | Dailey, Jr. |
| 5,179,177 A * | 1/1993 | Gerber ....................... 525/506 |
| 5,276,126 A * | 1/1994 | Rogler ....................... 528/155 |
| 5,344,909 A * | 9/1994 | Hutchings et al. ........... 528/129 |
| 5,470,924 A * | 11/1995 | Ryan .......................... 525/501 |
| 5,516,813 A * | 5/1996 | Starkey ....................... 522/25 |
| 5,684,114 A | 11/1997 | Phillips et al. |
| 5,708,087 A | 1/1998 | Buck et al. |
| 5,880,247 A * | 3/1999 | Horold et al. ............... 528/108 |
| 5,928,836 A * | 7/1999 | Rahman et al. ........... 430/270.1 |
| 6,045,966 A * | 4/2000 | Rahman et al. ........... 430/270.1 |
| 6,133,403 A | 10/2000 | Gerber |
| 6,159,405 A | 12/2000 | Taylor |
| 6,166,131 A * | 12/2000 | Tashima et al. ............. 525/54.5 |
| 6,214,964 B1 * | 4/2001 | Ryan .......................... 528/129 |
| 6,482,874 B2 * | 11/2002 | Kiyokawa et al. ........... 523/457 |
| 6,541,576 B1 * | 4/2003 | Phillips et al. .............. 525/495 |
| 7,074,861 B2 * | 7/2006 | Durairaj et al. ............. 525/502 |
| 7,205,353 B2 | 4/2007 | Bhattacharya |
| 7,319,131 B2 * | 1/2008 | Swedo et al. ................ 528/129 |
| 2003/0092866 A1 * | 5/2003 | Qureshi et al. ................ 528/27 |
| 2004/0210029 A1 * | 10/2004 | Fontana ...................... 528/144 |
| 2005/0215713 A1 * | 9/2005 | Hessell et al. ............... 525/162 |
| 2006/0247364 A1 * | 11/2006 | Murray et al. ............... 525/495 |

FOREIGN PATENT DOCUMENTS

GB 1318056 5/1973

OTHER PUBLICATIONS

Motawie, A.M.; Sadek, E.M.; Curing Of Natural Rubber and Epoxy Adhesive, Pakistan Journal of Scientific and Industrial Research (Jun. 2001), pp. 142-147; 44(3), Scientific Information Centre, Pakistan Council of Scientific and Industrial Research, Karachi.
Wismer, Marco; Bosso, Joseph F. A Novel Process For The Preparation Of Inorganic Foams, Cellular Plastics, Proceedings of a Conference, Natick, Massachusetts, Apr. 13-15, 1966, Publication No. 1462, (1967), pp. 153-166, National Academy of Sciences-National Research Council, Washington, D.C.

* cited by examiner

*Primary Examiner*—Mark Eashoo
*Assistant Examiner*—Liam J Heincer
(74) *Attorney, Agent, or Firm*—Michael S. Kerns

(57) ABSTRACT

An anhydride and resorcinol latent catalyst system for a phenolic resole resin provides a resin having long pot life and long shelf life, yet cures quickly thereafter.

17 Claims, No Drawings

ANHYDRIDE AND RESORCINOL LATENT CATALYST SYSTEM FOR IMPROVING CURE CHARACTERISTICS OF PHENOLIC RESINS

FIELD OF THE INVENTION

The invention relates to improving the cure characteristics of phenolic resins. In particular, the invention relates to an anhydride and resorcinol latent catalyst system for improving the cure characteristics of phenolic resole resins.

BACKGROUND OF THE INVENTION

Phenolic resins are the reaction product of a phenol and an aldehyde. Phenolic resins are available in two types: novolac resins and resole resins. Novolac resins have a molar excess of the phenolic compound. Novolac resins are not thermosetting resins. Rather, they require a catalyst to cure. Resole resins have a molar excess of the aldehyde compound, and are thermosetting. However, catalysts can be used with resole resins.

Phenolic resins are known in the art, inter alia, as versatile binders for composite materials suitable for many uses. In particular, phenolic resins are used to form materials that can be molded, with or without pressure, to form a desired shape. For example, phenolic resole resins are used as binders to produce structural panels and other products.

Because phenolic resole resins are cured by heat or chemically (by addition of acid, for example), they are particularly suited for molding processes. Molded products can be formed of resin alone, or can include substrates. For example, phenolic resins are used to form parts that are resin alone, and to bind together wood pieces to form composite boards, such as plywood or oriented strand board. Other material, such as fiber and wire, can serve as reinforcement for the resin. Other types of substrates also are known. For example, metal parts may be placed in a mold, which then is filled with resin. The molded piece thus incorporates the metal pieces in the resin.

Resin used for molding is required to satisfy many processing requirements. Phenolic resole resin is used in various processes, such as molding, pultrusion, forming of shaped reinforced objects, and forming of shaped objects with pressure. Whereas some of these processes require only mixing of resin with substrate, then curing, other processes require impregnation of the substrate, which might be in the form of a woven or non-woven mat or fiber. Each of these processes makes different demands on the resin.

Phenolic resole resins often are cured, or advanced, through three stages, specifically, A-stage, B-stage, and C-stage. An A-stage resin is a liquid wherein the reactants are mixed and may have begun to cure, but is not fully cured. A B-stage resin is an A-stage resin that is partially cured or dried. A C-stage resin is a fully cured resin. The time for which a resin can remain in each phase thus may be important to processability of the resin and the product containing it.

Resole resins used in processes that require impregnation of a mat or fiber, such as a process of making a reinforced composite product, require control of the pot life, or gel time of the resin. Pot life denotes the period during which the resin, in whatever stage, is suitable for use in the impregnation and manipulation steps of a process that may include impregnation, manipulation, hardening, and curing steps. Examples of such processes include processes that require saturation of a substrate with resin. Saturation of paper, such as kraft paper for formation of laminates and other papers, such as to form treated filters, is a particular example of such processes. Saturation of a woven or unwoven mat of fibers, such as glass fibers, for manufacture of reinforced structural members and pieces, is another example of such processes. After the impregnation and manipulation steps, the resin may be hardened, or cured.

Some applications require adequate 'shelf life' of the resin-impregnated substrate. Such an application requires that, during advancement, the B-staged, impregnated substrate be shelf-stable, i.e., afford the opportunity to keep the resin impregnated into the substrate at the B-stage. Thus, resins that proceed rapidly from A-stage to C-stage are unsuitable for such an application. The 'shelf life' is the period during which the resin remains in the B-stage. Thus, it is desired that the resin advance to B-stage quickly and have adequate shelf life at B-stage. Then, when the resin is again advanced, it should harden and cure quickly.

An uncatalyzed phenolic resole resin may provide a pot life sufficient to afford a reasonable opportunity to impregnate a substrate and manipulate the impregnated substrate. However, such a resin requires a long oven time (a long heating time) to advance through B-stage to cure. Such typical heat-reactive resins take too long to cure. Such resins require a long oven time to advance to B-stage, and then to complete cure.

One way to induce hardening is to add a chemical that catalyzes the reaction to induce hardening at the appropriate time. For example, addition of an acid is a known method for inducing curing. Such resins often are called acid-catalyzed resins.

Acid catalysis causes a phenolic resin to cure quickly. Acids used for such resins include the mineral acids, such as hydrochloric acid and sulfuric acid; organic acids, such as oxalic acid and maleic acid; and organic anhydrides, such as maleic anhydride. Resins at low pH in the presence of acid have a very fast cure, and a relatively short pot life. Typically, the pot life of such acid-cured resins is too short for processes that require impregnation and manipulation steps.

Latent catalyst systems were developed in an attempt to ameliorate the rapid cure rate of acid-catalyzed resins. Latent catalyst systems include phosphite hardeners. Latent catalyst systems typically provide a longer pot life than do acid catalyst systems. Indeed, the pot life may be sufficient for impregnation of substrates. However, latent catalyst systems typically cure too quickly upon heating, curing quickly from A-stage to C-stage. Therefore, these resins are unsatisfactory for systems requiring impregnation and storage life for substrate impregnated with resin and advanced to the B-stage.

It is possible to improve the cure speed of a resole resin by increasing the pH. However, to do so may create other problems. Adjusting the pH of a typical phenolic resole resin to 7-8 provides a resin with an appropriate pot life required for impregnation of substrate. However, such a resin cures slowly and typically has a poor shelf life. Hydroxides and organic amines typically are used to increase pH and accelerate hardening in these resins, but at the expense of pot life.

These catalyst systems illustrate the difficulty in producing a phenolic resole resin system that meets the requirements of processes that require reasonable pot time for impregnation and manipulation to a B-stage, yet cure quickly when advancement to the C-stage is desired. Thus, there exists a need for a phenolic resole resin that has a pot life suitable for impregnation of substrate, a long shelf life when partially cured, and a rapid cure rate thereafter.

BRIEF SUMMARY OF THE INVENTION

A first embodiment of the invention is directed to improving cure characteristics of phenolic resole resins.

A second embodiment of the invention is directed to an anhydride and resorcinol latent catalyst system for improving the cure characteristics of phenolic resole resins.

A third embodiment of the invention is directed to phenolic resole resins having a pot life suitable for impregnation of a substrate, extended shelf life, and a rapid cure rate thereafter.

DETAILED DESCRIPTION OF THE INVENTION

The invention is directed to improving cure characteristics of phenolic resole resins. Resins having the improved characteristics have, inter alia, a pot life sufficient to impregnate substrates, an extended shelf life at the B-stage, and then cure rapidly to C-stage.

The inventors have discovered that addition of anhydride and resorcinol, or a resin containing resorcinol, to a phenolic resole resin synthesized having an amine catalyst produces a phenolic resole resin having an extended pot life and an extended shelf life, with a rapid cure rate thereafter.

Phenolic resole resin of the invention is used, inter alia, to form impregnated substrates that are used to form reinforced composites. The impregnated substrates often are called 'pre-pregs.' Substrate is impregnated while the resin is in the A-stage. Impregnated substrate is molded to form a desired shape, and the resin is advanced to B-stage (e.g. dried and partially cured). The pre-preg thus retains its shape, but the resin is not yet fully cured. The resin is fully cured only when the pre-preg is formed into its final shape, typically as part of a laminated structure in a press. Thus, a phenolic resole resin used in this process preferably has a long pot life, so that the substrate can be impregnated and the pre-preg formed. Also, the resin preferably has a long shelf life, so that the pre-preg can be manipulated (including storage until needed). In the final step, however, the cure rate preferably is rapid. The phenolic resole resin of the invention provides these complete characteristics.

Phenolic resole resins are known to the skilled practitioner. Although the invention relates to phenolic resole resin having either an aqueous base or a solvent base, the invention will be described herein as directed to a solvent-based resin. Solvent-based phenolic resole resin is a more typical embodiment of the base resin.

Phenolic resole resins suitably used in the invention comprise a phenolic component, an aldehyde component, and an amine catalyst. The molar ratio of formaldehyde component (F) to phenolic component (P) is greater than 1:1. Typically, the molar ratio of formaldehyde component to phenolic component, F:P, is at least about 1.2:1. An F:P ratio within the range of 1.2:1 to 2:1 is expected.

The phenolic component is a compound having an aromatic ring containing a single hydroxyl moiety. Typically, the phenolic component is phenol, but can be a cresol, bisphenol-A, 3,5-xylenol, or any substituted phenol having a single hydroxyl moiety.

The aldehyde component can be any aldehyde. Typically, the aldehyde component is formaldehyde. However, any aldehyde, such as benzaldehyde, furfuraldehyde, or acetaldehyde, can be used. The skilled practitioner recognizes that formaldehyde is available in a variety of forms, such as a gas; an aqueous solution (often 37 or 50 wt percent formaldehyde in water); an aqueous solution with additives, such as formol (aqueous solution with methanol); and polymeric forms, such as paraform, which is available as a solid or as an aqueous solution. Any of these forms of formaldehyde can be used to form phenolic resole resin.

The reaction of a phenolic component with an aldehyde component typically is carried out in the presence of a solvent and a catalyst. The skilled practitioner recognizes that both aqueous and non-aqueous solvents can be used in the manufacture of phenolic resole resin. The non-aqueous solvents can be selected from alcohols having 1 to about 5 carbon atoms and diacetone alcohol; glycols having 2 to about 6 carbon atoms; mono- and di-methyl and -butyl ethers of glycols; low molecular weight polyethylene glycols (molecular weight of between about 200 and about 800); cyclic ethers (such as tetrahydrofuran and m-dioxolane); and aprotic solvents, such as dimethyl sulfoxide, methyl ethyl ketone, and methyl isobutyl ketone.

The concentration of solvent is selected to achieve a workable resin without requiring removal of excess during pressing. The concentration of solvent typically is less than about 50 wt percent, more typically between about 25 and about 40 wt percent, based on the weight of the resin. The skilled practitioner recognizes that the concentration of monohydric alcohols or glycols should be limited to between about 5 wt percent an d 10 wt percent, based on of the resin, because these alcohols and glycols retard the cure speed.

Water can be used in conjunction with solvent or as the solvent to achieve acceptable viscosity for impregnation. As when other solvents are used, the skilled practitioner recognizes that the amount of solvent used to achieve the target viscosity is that minimum amount that results in an appropriate viscosity without having to evaporate a large quantity of solvent during subsequent steps.

The skilled practitioner recognizes that the resole resins suitably used in the invention have a molar excess of formaldehyde or other aldehyde. Therefore, all of the phenol component will have reacted with the aldehyde component, and there will be very little free phenol in these resins. There will, however, be a molar excess of formaldehyde or aldehyde components.

An amine catalyst is used in synthesizing the phenolic resole resin of the invention. Use of an amine catalyst keeps the pH of the resin in the range of between about 6 and about 8.5. Amine catalyst is selected from organic amine compounds, such as hexamethylene tetraamine, hexamethylene triamine, dimethylethanolamine, triethylamine, triethanol amine, and ethylene diamine. Combinations of these amine catalysts also can be used.

The concentration of amine catalyst in the mixture of phenolic and aldehyde components and any solvents typically is between about 0.0001 to 0.2 moles per mole of phenolic component, and more typically is between about 0.0008 to about 0.1 moles per mole of phenolic component.

The inventors have discovered that addition of an anhydride and a resorcinol or resorcinol-containing resin as catalysts for a phenolic resin synthesized using an amine catalyst yields a phenolic resole resin having good pot life, good shelf life, and a rapid cure to a C-stage resin from B-stage resin. In particular, the cure time from B- to C-stage is only about one-half of that of a resin catalyzed with amine alone. Thus, the resin provides a good pot life to enable impregnation of substrate, provides a good shelf life to enable a B-stage resin composite (often called a 'pre-preg') to be manipulated, and cures quickly to C-stage thereafter, for example, during pressing.

The anhydride/resorcinol system may be called a latent catalyst system because it provides cure rate acceleration in the final stage of curing.

The anhydride used as one component of the latent catalyst system is selected from the group of acid anhydrides, such as maleic anhydride and phthalic anhydride, or a blend thereof. The quantity of anhydride is between about 0.1 and about 10 parts by weight per 100 parts of base resin, preferably between about 0.5 and about 8, and more preferably between about 1 and about 6 parts by weight per 100 parts base resin.

Resorcinol, the other component of the latent catalyst system, can be added in the form of resorcinol solids, in aqueous or organic solution, or a resorcinol-containing resin. Suitable resorcinol-containing resins include resorcinol/aldehyde resins having a molar excess of resorcinol. Typically, the aldehyde in the resin is formaldehyde and the molar ratio of resorcinol to formaldehyde is between about 1:1 and about 2:1, more typically between about 1.25:1 and about 1.6:1. The quantity of resorcinol is between about 0.1 and about 5 parts by weight per 100 parts of base resin, preferably between about 0.5 and about 4 parts, and more preferably between about 1 and about 3 parts by weight per 100 parts base resin. Typically, the molar ratio of aldehyde to resorcinol is between about 2:7 and about 5:2.

The base phenolic resole resin is made in accordance with a method known to the skilled practitioner. Typically, phenol and formaldehyde are mixed and heated, often to about 120° F. At the elevated temperature, the amine catalyst is added, and the temperature is allowed to rise to a temperature typically below about 190° F. The catalyzed mixture is reacted at an elevated temperature until the desired degree of condensation (typically A-stage) is reached. Then, typically, water resulting from the condensation of the phenol and the formaldehyde is removed by distillation until the desired concentration is reached.

As the skilled practitioner recognizes, there exist various ways of determining the stage of advancement for the purpose of stopping the condensation reaction. Typically, one such method is to continue condensation until the viscosity, measured in an appropriate manner, achieves a predetermined level. Another suitable technique for determining the degree of condensation is to measure the refractive index. Skilled practitioners are familiar with these and other methods for determining the degree of condensation.

Anhydride and resorcinol are thoroughly mixed into thus-prepared resin. This resin now is ready for impregnation of substrates.

EXAMPLES

Example 1

Preparation of Base Phenolic Resole Resin

A base phenolic resole resin was prepared by loading phenol and formaldehyde into a suitable kettle. The relative proportions of the reactants are set forth in Table I below. The temperature was adjusted to 120-125° F. and dimethylethanolamine catalyst was added. The reactants were heated to 170° F. and allowed to react under vacuum for 45 minutes. The temperature was raised to 185° F. and held at this temperature for a time sufficient to achieve the desired E viscosity on a Gardiner-Holdt viscometer. The resin then is vacuum distilled to remove water. Denatured ethanol was added as solvent to adjust Brookfield viscosity to the desired level.

TABLE 1

| Reactant | Wt Percent |
| --- | --- |
| Phenol | 48.3 |
| Formaldehyde, 50% aqueous sol'n | 43.1 |
| Dimethylethanolamine | 1.5 |
| Denatured ethanol | 7.1 |

Example 2

Preparation of Base Phenolic Resole Resin

A base phenolic resole resin was made by loading phenol and formaldehyde into a kettle in the proportions set forth in Table 2 below. The temperature was adjusted to 50° C., then hexamethylene tetraamine amine catalyst in granular form was added. The temperature was raised to 85° C. and the resin was advanced to achieve a Gardner-Holdt viscosity of GH. At the desired degree of advancement, the temperature was cooled to 55° C. and water was removed from the vessel by vacuum distillation at this temperature and at 75° C. The temperature then was reduced to 50° C. and the methanol was added.

TABLE 2

| Reactant | Wt Percent |
| --- | --- |
| Phenol | 54.6 |
| Formaldehyde, 50% aqueous sol'n | 35.9 |
| Hexamethylene tetraamine | 0.27 |
| Ethylene diamine | 0.28 |
| Methanol | 8.9 |

Example 3

Preparation of a Base Phenolic Resole Resin

A base phenolic resole resin was prepared by mixing phenol and formaldehyde solution in a kettle and adjusting the temperature to 55° C. Hexamethylene tetraamine granules were charged, then ethylenediamine was added. The temperature was increased to 85° C. until free formaldehyde was less than 2.5 wt percent, then was reduced to 55° C. Water was distilled until the refractive index was 1.585 and the water concentration was 7 wt percent, based on the weight of the resin. The temperature was raised to 75° C. until a sample diluted with methyl ethyl ketone to a refractive index of 1.555 was 750 cps. The temperature then was reduced to 50° C. and methyl ethyl ketone was added. The temperature was reduced to 25° C. and methyl ethyl ketone was added until the refractive index reached 1.5525. The proportions of the reactants were as set forth in Table 3.

TABLE 3

| Reactant | Wt Percent |
| --- | --- |
| Phenol | 50.3 |
| Formaldehyde, 50% aqueous sol'n | 40.2 |
| Hexamethylene tetraamine granules | 0.27 |
| Ethylenediamine | 0.33 |
| Methyl Ethyl Ketone | 8.9 |

Example 4

Resorcinol/Formaldehyde Latent Catalyst Resin

A resorcinol/formaldehyde latent catalyst resin was prepared by mixing formaldehyde into water having a pH between about 6.5 and 8.5. Resorcinol was loaded, and the mixture is heated to 77° F. to dissolve the resorcinol. After a reaction period, methanol was added, and then water sufficient to obtain a refractive index of about 1.4644. Then, the first lime/water slurry was added and the batch heated to 122°

F. under vacuum. The batch then was heated to about 210° F. and cooked under vacuum to obtain a stable Gardner-Holdt viscosity.

SYLOX® defoamer was added, and the temperature was held at 160° F. for about 45 minutes until the refractive index was 1.4903. Then, the temperature was increased to 138° F. and the resin was vacuum distilled to a refractive index of 1.5493. The second lime/water slurry and the methanol were charged and the temperature decreased. The aniline was added when the refractive index reached 1.5342, then the caustic was loaded. Water was added to adjust the refractive index back to 1.5342. The reactants were in the proportions in Table 4 below:

TABLE 4

| Reactant | Wt Percent |
| --- | --- |
| Water | 23.2 |
| Formaldehyde, 50% aqueous sol'n | 15.6 |
| Resorcinol solids | 47.6 |
| Methanol | 1.0 |
| First Lime/water slurry | 0.04/0.08 |
| SYLOX ® 2 | 2.1 |
| Second Lime/water slurry | 1.3/2.6 |
| Methanol | 2.4 |
| Aniline | 0.1 |
| Caustic, 50% NaOH solution | 1.0 |

Example 5

The cure speeds of base phenolic resole resin, base resin containing an anhydride, and phenolic resole resin of the invention, comprising both anhydride and resorcinol, were compared. The data in the following table indicates that resin comprising both anhydride and resorcinol has a significantly faster curing time than the other resins. The skilled practitioner recognizes that shorter gel time means faster cure.

TABLE 5

| Base Resin (100 pbw) | Anhydride (pbw) | Resorcinol Catalyst (pbw) | Gel Time @ 150° C., sec |
| --- | --- | --- | --- |
| Example 3 Control | — | — | 120 |
| Example 3 | Maleic (2.0) | — | 52 |
| Example 3 | Maleic (2.0) | Example 4 (3.0) | 35 |
| Example 3 | Phthalic (2.0) + Maleic (1.0) | — | 56 |
| Example 3 | Phthalic (2.0) + Maleic (1.0) | Example 4 (3.0) | 37 |
| GP5006 | — | — | 126 |
| GP5006 | Phthalic (5.0) | — | 32 |

GP5006 is a phenolic resole resin commercially available from Georgia-Pacific Resins, Inc. The resin comprises between about 75 and about 78 weight percent solids, a gel time at 150° C. of between about 80 and about 125 seconds The viscosity of the resin at 25° C. is between about 2600 and about 3400 cPs, and the pH is between about 8.3 and about 8.7. The resin comprises between about 5.0 and about 7.0 weight percent free phenol and a max of 0.8 weight percent of free formaldehyde.

Example 6

The effect of storage at 25° C. was determined for phenolic resole resin and resins of the invention comprising anhydride and resorcinol. The percent viscosity increase after 21 days at 25° C., as set forth in Table 6 below, indicates that the anhydride and resorcinol did not reduce the storage stability and working life of the resin, as reflected by the relationship between viscosity and time. The data shows that resins of embodiments of the invention comprising anhydride and resorcinol experience a lower percentage increase in viscosity after 21 days storage at 25° C. than the control.

TABLE 6

| Base Resin (100 pbw) | Anhydride (pbw) | Resorcinol Catalyst (pbw) | % Viscosity Increase after 21 days @ 25° C. |
| --- | --- | --- | --- |
| Example 3 (Control) | — | — | 27 |
| Example 3 | Maleic (1.0) Phthalic (2.0) | Example 4 (3.0) | 22 |
| Example 3 | Maleic (2.0) | Example 4 (3.0) | 21 |
| Example 3 | Phthalic (5.0) | Example 4 (2.0) | 20 |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A phenolic resole resin comprising a phenolic component, an aldehyde component, an amine catalyst, and a latent catalyst system, said latent catalyst system comprising an acid anhydride and resorcinol, wherein the addition of the latent catalyst system does not reduce the storage stability of the resin, as reflected by the percent viscosity increase after 21 days at 25° C.

2. The resin of claim 1 wherein the amine is an organic amine compound and is present in a concentration of between about 0.0001 and about 0.2 moles per mole of phenolic component.

3. The resin of claim 2 wherein the organic amine compound is selected from the group consisting of hexamethylene tetraamine, hexamethylene triamine, dimethylethanolamine, triethylamine, triethanol amine, ethylene diamine, and blends thereof.

4. The resin of claim 2 wherein the acid anhydride is selected from the group consisting of maleic anhydride, phthalic anhydride, and blends thereof, and is present in a concentration of between about 0.1 and about 10 parts by weight per 100 parts of base resin.

5. The resin of claim 4 wherein the resorcinol is selected from the group consisting of resorcinol solid, resorcinol in aqueous or organic solution, or a resorcinol-containing resin having a molar excess of resorcinol, and blends thereof, and is present in a concentration of between about 0.1 and about 5 parts by weight per 100 parts of base resin.

6. The resin of claim 2 wherein the resorcinol is selected from the group consisting of resorcinol solid, resorcinol in aqueous or organic solution, or a resorcinol-containing resin having a molar excess of resorcinol, and blends thereof, and is present in a concentration of between about 0.1 and about 5 parts by weight per 100 parts of base resin.

7. The resin of claim 1 wherein the acid anhydride is selected from the group consisting of maleic anhydride, phthalic anhydride, and blends thereof, and is present in a concentration of between about 0.1 and about 10 parts by weight per 100 parts of base resin.

8. The resin of claim 7 wherein the resorcinol is selected from the group consisting of resorcinol solid, resorcinol in aqueous or organic solution, or a resorcinol-containing resin having a molar excess of resorcinol, and blends thereof, and is present in a concentration of between about 0.1 and about 5 parts by weight per 100 parts of base resin.

9. The resin of claim 1 wherein the resorcinol is selected from the group consisting of resorcinol solid, resorcinol in aqueous or organic solution, or a resorcinol-containing resin having a molar excess of resorcinol, and blends thereof and is present in a concentration of between about 0.1 and about 5 parts by weight per 100 parts of base resin.

10. A method for accelerating the cure time of a phenolic resole resin comprising a phenolic component and an aldehyde component and catalyzed with an amine catalyst, said method comprising mixing an acid anhydride and resorcinol latent catalyst system with the resin and curing the resin, wherein the addition of the acid anhydride and resorcinol latent catalyst system does not reduce the storage stability of the resin, as reflected by the percent viscosity increase after 21 days at 25° C.

11. The method of claim 10 wherein the amine is an organic amine compound and is present in a concentration of between about 0.0001 and about 0.2 moles per mole of phenolic component.

12. The method of claim 11 wherein the organic amine compound is selected from the group consisting of hexamethylene tetraamine, hexamethylene triamine, dimethylethanolamine, triethylamine, triethanol amine, ethylene diamine, and blends thereof.

13. The method of claim 11 wherein the acid anhydride is selected from the group consisting of maleic anhydride, phthalic anhydride, and blends thereof and is present in a concentration of between about 0.1 and about 10 parts by weight per 100 parts of base resin.

14. The method of claim 13 wherein the resorcinol is selected from the group consisting of resorcinol solid, resorcinol in aqueous or organic solution, or a resorcinol-containing resin having a molar excess of resorcinol, and blends thereof; and is present in a concentration of between about 0.1 and about 5 parts by weight per 100 parts of base resin.

15. The method of claim 11 wherein the resorcinol is selected from the group consisting of resorcinol solid, resorcinol in aqueous or organic solution, or a resorcinol containing resin having a molar excess of resorcinol, and blends thereof, and is present in a concentration of between about 0.1 and about 5 parts by weight per 100 parts of base resin.

16. The method of claim 10 wherein the acid anhydride is selected from the group consisting of maleic anhydride, phthalic anhydride, and blends thereof, and is present in a concentration of between about 0.1 and about 10 parts by weight per 100 parts of base resin.

17. The method of claim 10 wherein the resorcinol is selected from the group consisting of resorcinol solid, resorcinol in aqueous or organic solution, or a resoreinol containing resin having a molar excess of resorcinol, and blends thereof, and is present in a concentration of between about 0.1 and about 5 parts by weight per 100 parts of base resin.

* * * * *